(12) United States Patent
Germanton

(10) Patent No.: US 7,151,232 B2
(45) Date of Patent: Dec. 19, 2006

(54) WEIGHING SCALE WITH LEVEL COMPENSATING FOOT ASSEMBLY

(75) Inventor: Damon Germanton, Kinnelon, NJ (US)

(73) Assignee: Measurement Ltd.

( * ) Notice: Subject to any disclaimer, the term of this patent is extended or adjusted under 35 U.S.C. 154(b) by 0 days.

(21) Appl. No.: 11/215,826

(22) Filed: Aug. 30, 2005

(65) Prior Publication Data

US 2006/0065450 A1    Mar. 30, 2006

Related U.S. Application Data

(63) Continuation of application No. 10/695,216, filed on Oct. 28, 2003, now Pat. No. 6,936,776, which is a continuation of application No. 10/213,289, filed on Aug. 6, 2002, now Pat. No. 6,639,158.

(51) Int. Cl.
*G01G 21/28*    (2006.01)

(52) U.S. Cl. .................. 177/238; 248/188.1; 248/615; 248/646

(58) Field of Classification Search ........ 177/256–259, 177/238; 248/188.1, 615, 646
See application file for complete search history.

(56) References Cited

U.S. PATENT DOCUMENTS

| | | | |
|---|---|---|---|
| 4,458,771 A * | 7/1984 | Hanssen et al. ............ 177/256 |
| 4,554,987 A | 11/1985 | Dillon ........................ 177/134 |
| 4,739,848 A * | 4/1988 | Tulloch ....................... 177/211 |
| 4,832,142 A | 5/1989 | Germanton ................. 177/256 |
| 4,844,189 A * | 7/1989 | Shisgal et al. .............. 177/211 |
| 5,119,896 A | 6/1992 | Freeman et al. ............ 177/244 |
| 5,141,065 A | 8/1992 | Maxwell et al. |
| 5,205,369 A | 4/1993 | Neeleman ................... 177/229 |
| 5,520,762 A | 5/1996 | Rasmussen ................. 156/216 |
| 5,653,417 A | 8/1997 | DeBarber et al. .......... 248/688 |
| 5,894,112 A | 4/1999 | Kroll .......................... 177/134 |
| 6,177,638 B1 | 1/2001 | Murray ....................... 177/134 |
| 6,407,351 B1 | 6/2002 | Meyer et al. ............... 177/238 |
| 6,639,158 B1 * | 10/2003 | Germanton ................. 177/238 |
| 6,677,540 B1 * | 1/2004 | Moretto ...................... 177/256 |
| 6,936,776 B1 * | 8/2005 | Germanton ................. 177/238 |

FOREIGN PATENT DOCUMENTS

EP    1026484    9/2000

* cited by examiner

*Primary Examiner*—Randy W. Gibson
(74) *Attorney, Agent, or Firm*—Plevy, Howard & Darcy, PC

(57) ABSTRACT

A foot assembly for a weighing scale comprises a base, a ring arranged in coaxial spaced relation to the base; and a plurality of deformable compensation beams projecting outwardly from a portion of the base so as to support the ring.

6 Claims, 11 Drawing Sheets

WEIGHING SCALE WITH LEVEL COMPENSATING FOOT ASSEMBLY

This application is a continuation of U.S. patent application Ser. No. 10/695,216, filed Oct. 28, 2003 now U.S. Pat. No. 6,936,776, which is a continuation of U.S. patent application Ser. No. 10/213,289, filed Aug. 6, 2002, now U.S. Pat. No. 6,639,158, and entitled "Weighing Scale with Level Compensating Foot Assembly".

FIELD OF INVENTION

This invention relates generally to electronic type platform weighing systems, and more particularly to a freestanding scale having an improved base member for aligning parts of the scale.

BACKGROUND OF THE INVENTION

There are many different types of electronic weighing scales in use today. One popular type of electronic weighing scale is constructed with a platform for receiving the load to be weighed and a set of levers, pivots, flexures, and torque tubes to mechanically combine the forces applied to the platform by the load. The combined forces are then applied to a single electronic load cell to yield the weight of the load. The load cell is typically constructed with a mechanically-deformable sensor plate which operates as a force transducer. The sensor plate includes one or more sensor elements that serve to convert the mechanical bending forces of the sensor plate into electrical signals. When a load is applied to such a load cell, the sensor elements produce electrical signals which are proportional to the load applied to the load cell.

Many load cells utilize a measurement beam which carries all or a part of the load to be measured and thus deforms as a function of the weight of the load. Load cell measurement beams are typically either of two types, bending beams or shear beams. Bending beams undergo bending strains that vary as a function of the weight of the load applied to the beams, while shear beams undergo shear strains that vary as a function of the weight of the load applied to the beams. Strain measuring devices, such as strain gauges or the like, are normally mounted on the beams to measure the magnitude of the load induced bending strains in bending beams or the load induced shear strains in shear beams.

The accuracy of load cells employing bending beams and shear beams is highly dependent on the manner in which the beams are supported and/or how the loads are coupled to the beams. Ideally, changes in the load induced deformation of the beam, i.e., the bending strain or shear strain, should be solely a function of changes in the weight of the load. If the structure that either supports the beam or couples the load to the beam applies rotational moments or twisting torques to the beam, then the deformation of the beam will not be a true indication of the weight of the load.

Not only should the beam be supported and/or loaded in a manner that does not apply rotational moments or twisting torques to the beam, but the beam supporting or loading structure should not restrain the beam from the load induced deformations that are to be measured. For example, for a beam that is freely supported at each end, i.e., a non-cantilever beam, the support structure should allow the ends of the beam to freely pivot.

The location at which the beam is supported and/or the location where the load is applied to the beam can also affect the accuracy of load cells using measurement beams. In particular, it is important that the beams be symmetrically supported and loaded so that the weight induced deformation of the beam is symmetrical.

The foregoing problems in the art can exist in any weighing scale that employs measurement beams, and can be especially exasperated by the placement of the scale on an uneven support surface. As a result of supporting the weighing scale on an even surface there can be large variations in both the direction and the location that the load is applied to the bending beams and shear beams through the support structure.

In the past, attempts have been made to ensure the proper direction and location of beam support and loading by either using complex and costly mechanical coupling mechanisms or by attempting to electrically compensate for the inaccuracies. For example, in U.S. Pat. No. 4,554,987, a scale assembly is provided that includes a platform which is supported by a plurality of force transmitting assemblies. The force transmitting assemblies and platform cooperate to automatically center the platform relative to an enclosing structure and to align the force transmitting assemblies and platform. The automatic centering of the platform and aligning of the force transmitting assemblies is accomplished by moving the platform back and forth in sideways directions against stops which limit motion of the platform. Centering the platform and aligning the force transmitting assemblies is claimed to be effective to eliminate sideward force components on load cells.

In U.S. Pat. No. 6,177,638, a portable load scale is disclosed for use in rugged terrain or at locations without suitable support pads. The load scale includes a support deck affixed to a base platform through a plural number of load cells. The base platform is constructed to provide ramp members joined by longitudinal runner assemblies to form a rigid, non-flexing assembly having a central gap and gaps between pairs of ramp members to reduce the standard rectangular footprint by approximately thirty percent. The runner assemblies are constructed so that the bottom of the support deck is separated from the top of the base plate of the runner assemblies by a distance of several inches. The load cells are mounted onto the underside of the support deck and joined to the base platform by ball bushings such that the load cells can pivot in any or about all axis directions relative to the base platform to relieve stresses induced by uneven terrain.

None of the prior art weighing systems have proved to be wholly satisfactory, especially when the weighing system is also to be portable, light weight, and of a size that is appropriate for table top applications. There remains a need for an improved structure that supports the beams, or couples the load to the beams, to reduce or prevent the application of unwanted rotational moments or twisting torques to the beam system, so that the deformation of the beam will be a true indication of the weight of the load.

SUMMARY OF THE INVENTION

In one embodiment of the invention, a weighing scale comprises a platform operatively coupled to a plurality of foot assemblies. Each foot assembly comprises a base having a bottom surface for contacting a portion of a floor, a retaining member arranged in spaced relation to the base; and a plurality of deformable compensation beams projecting outward from a portion of the base to support the retaining member. A plurality of force transfer beams are arranged to operatively interconnect to the plurality of foot assemblies. A mounting portion is coupled to a bottom surface of the platform and associated with each of the plurality of foot assemblies. In response to a force applied to a top surface of the platform, the force is translated to the mounting portion engaging the bottom surface without the platform contacting the force transfer beams, to cause a downward force to be applied to the foot assemblies. The deformable beams tend to locate the applied force at a central position where the foot assemblies engage the force transfer beams.

In another embodiment, a foot assembly for a weighing scale comprises a base, a ring arranged in coaxial spaced relation to the base; and a plurality of deformable compensation beams projecting outwardly from a portion of the base so as to support the ring.

In another embodiment of the invention, a weighing scale is provided including a platform coupled to a mounting tray, where the mounting tray has a plurality of apertures. A weight determination assembly is positioned between the platform and the mounting tray. A plurality of force transfer beams are arranged within the mounting tray so as to substantially support the platform and the mounting tray such that the mounting tray is isolated from a support surface. In this way, forces that are applied to the weighing scale by the placement of a load on the platform are transferred to the plurality of force transfer beams, without direct interaction between the mounting tray and the support surface. A plurality of foot assemblies are positioned within the apertures and operatively interconnected to the plurality of force transfer beams. Each of the foot assemblies includes a base having a plurality of compensation beams that project radially outwardly so as to support a ring that is coupled to the mounting tray. In this way, if a support surface onto which the weighing scale is placed is canted at some angle, the compensation beams twist and/or bend so as to take up and compensate for any unwanted rotational moments or twisting torques.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF THE INVENTION

Figure 1:
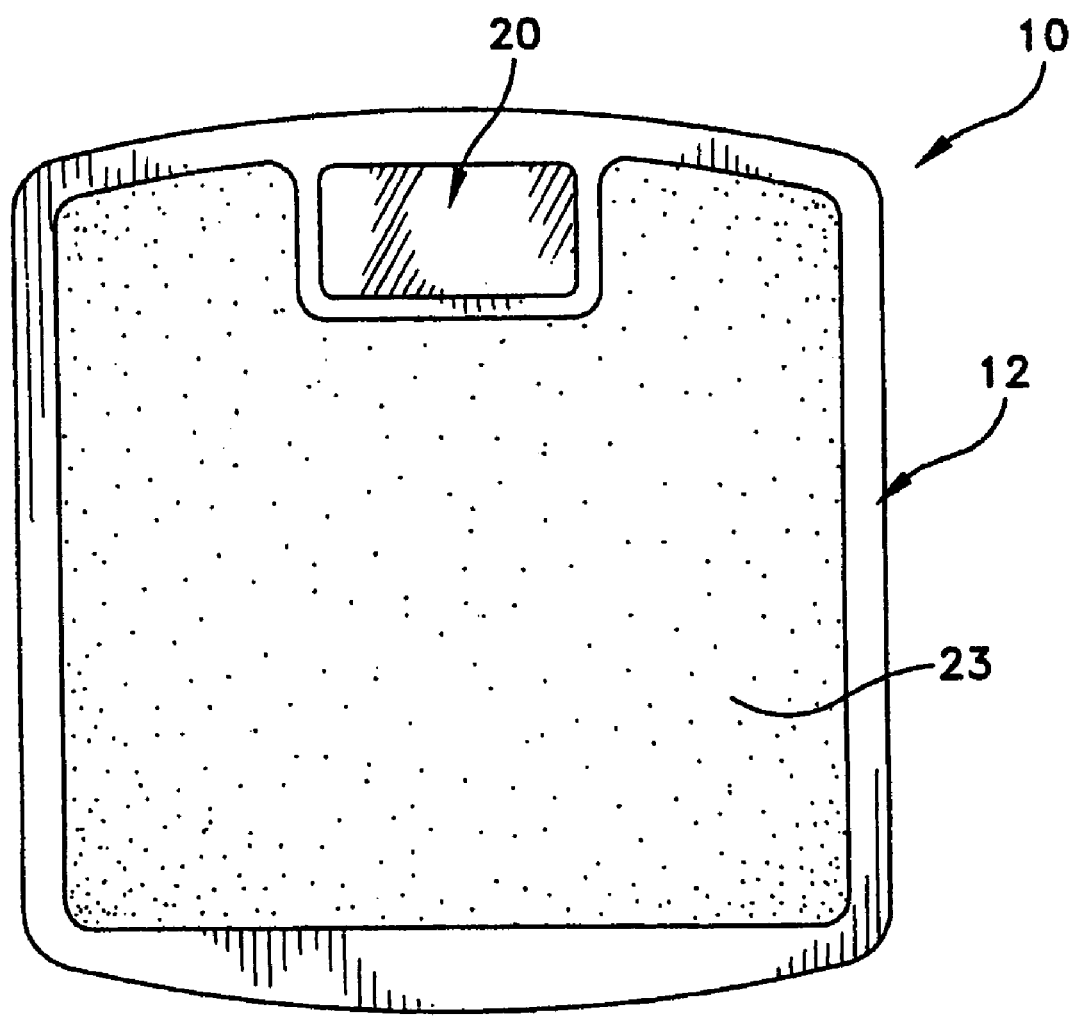
FIG. 1 is a front elevational view of a weighing scale formed in accordance with the present invention.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected or interconnected" is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

Figure 2:
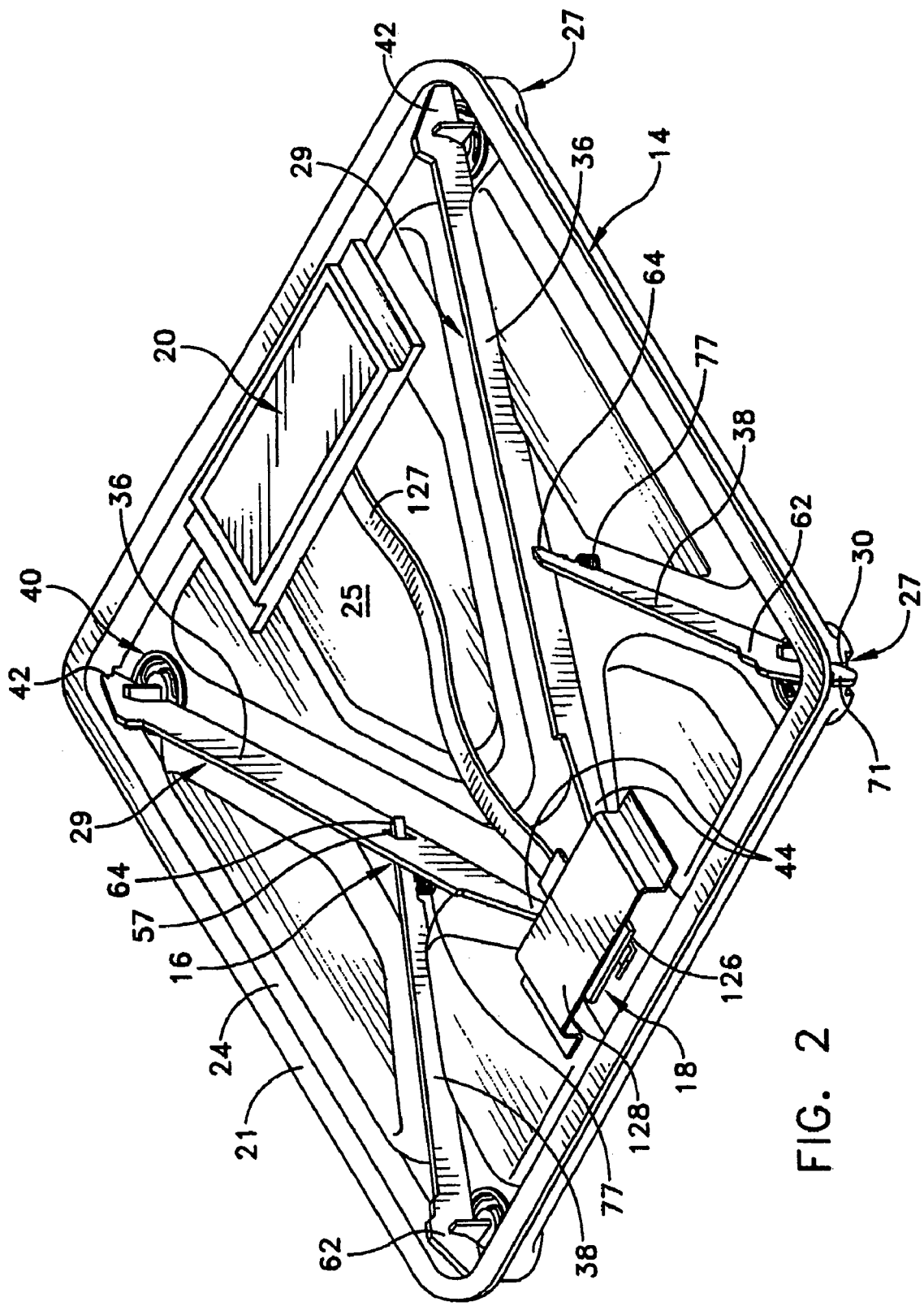
FIG. 2 is a perspective view of the weighing scale shown in FIG. 1, with the platform removed for clarity of illustration.

Referring to FIGS. 1 and 2, a scale 10 formed in accordance with the present invention includes a platform 12, a mounting tray 14, a force transfer assembly 16, a weight determination assembly 18, and a display 20. More particularly, platform 12 is sized and shaped so as to be positioned in overlying relation to mounting tray 14. Platform 12 and mounting tray 14 are often rectilinearly shaped, and are normally formed from either metal or a stiff polymer. Other shapes are also possible for use with the present invention. Platform 12 and mounting tray 14 are coupled to one another along a peripheral edge 21 in a conventional manner, e.g., mechanical fasteners, welds, adhesive bonding, or the like. A receiving surface of platform 12, upon which a load may be placed, is often covered by a vinyl or plastic sheet 23 so as to provide a non-slip surface.

Mounting tray 14 is typically molded from a suitable engineering polymer, or formed (i.e., stamped or drawn from a suitable metal sheet) so as to have an annular wall 24 supporting peripheral edge 21, and surrounding a central, channeled surface 25 (FIG. 2). A plurality of apertures 27 are defined through portions of central surface 25 in spaced apart relation to one another. For example, when scale 10 comprises a rectilinear shape, apertures 27 are located in the corners of mounting tray 14. A vertically oriented slot 30 is defined within the portion of wall 24 that is adjacent to a respective one of each of plurality of apertures 27. A plurality of recessed channels 29 are also formed in central surface 25 of mounting tray 14. Plurality of recessed channels 29 are sized and arranged in central surface 25 so as to receive and locate portions of force transfer assembly 16, weight determination assembly 18, and display 20.

Figure 3:
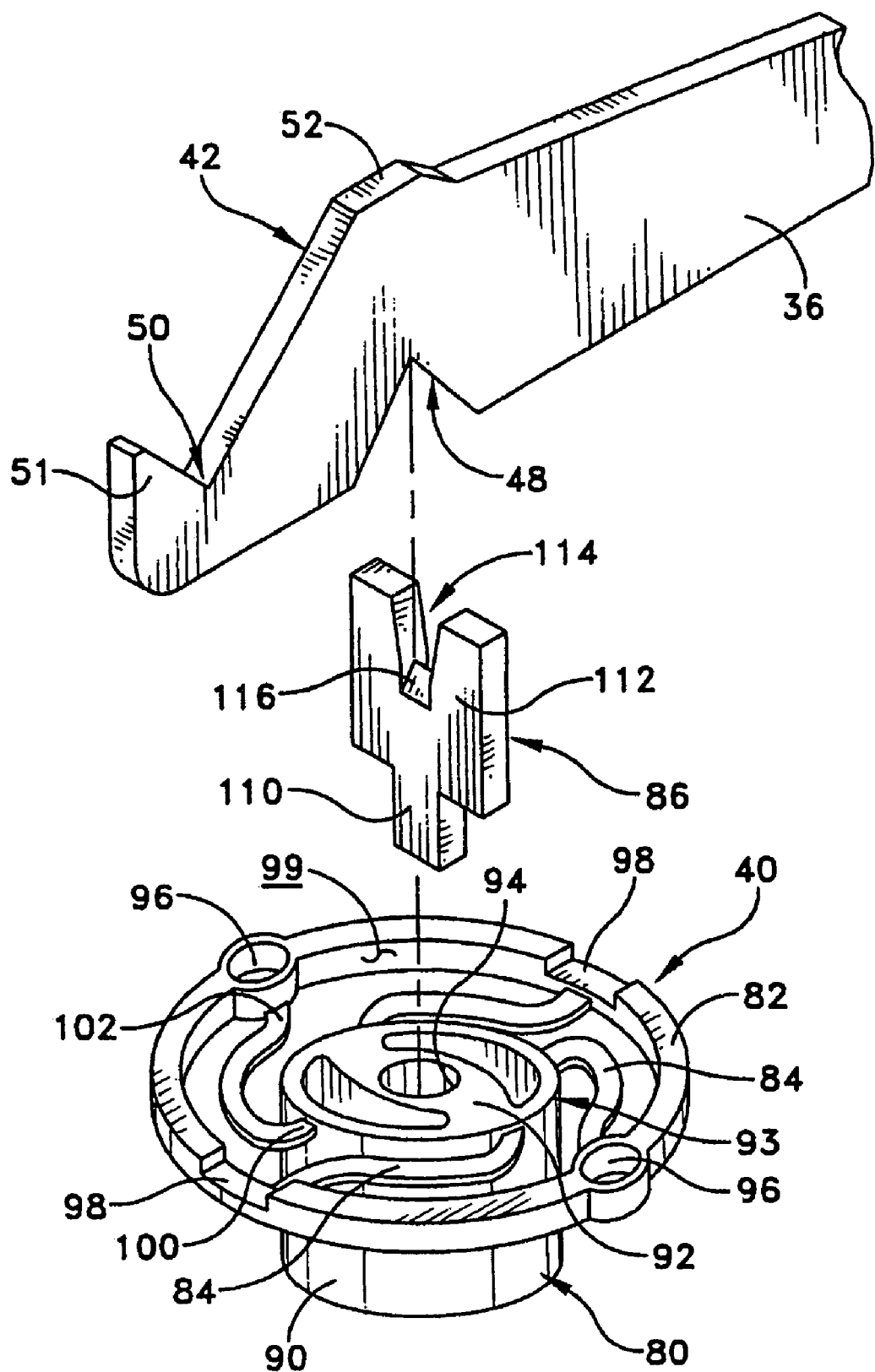
FIG. 3 is a partially broken away, exploded perspective view of a foot assembly and primary beam formed in accordance with the present invention.
Figure 4:
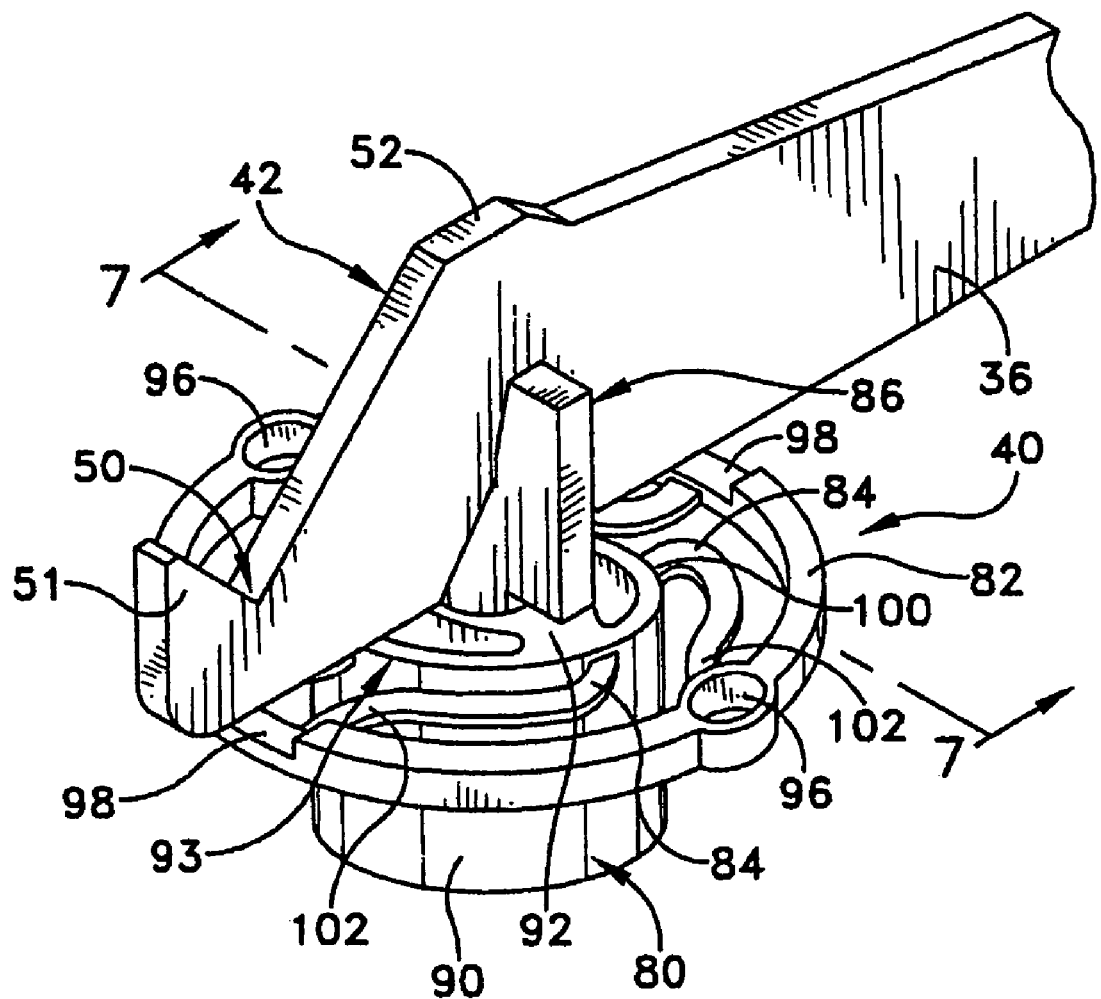
FIG. 4 is a partially broken away, perspective view of the foot assembly shown in FIG. 3, assembled in accordance with the present invention.

Referring to FIGS. 2–4, force transfer assembly 16 includes a pair of primary beams 36, a pair of secondary beams 38, and a plurality of foot assemblies 40. More particularly, each primary beam 36 is formed from a substantially flat strip of metal often having a length that is larger than its width, and a width that is larger than its thickness, e.g. a thin, elongate plate. Primary beams 36 each include a foot engagement end 42 and a sensor engagement end 44. Each foot engagement end 42 includes a substantially "V" shaped pier-notch 48, a substantially "V" shaped tray-notch 50, a cam lock 51 and at least one platform support pad 52 (FIGS. 3 and 4). Pier-notch 48 and tray-notch 50 open onto different edges of foot engagement end 42. Primary beams 36 are arranged within channels 29 of central surface 25 such that sensor engagement ends 44 are located adjacent to one another and to weight determination assembly 18 (FIG. 2). Each sensor engagement end 44 is adapted to operatively engage a portion of weight determination assembly 18. In this arrangement, foot engagement ends 42 are positioned in spaced apart relation to one another, and each overtop of a respective aperture 27. A coupling hole 57 is defined through a portion of each primary beam 36 in spaced relation to both foot engagement end 42 and sensor engagement end 44.

Figure 5:
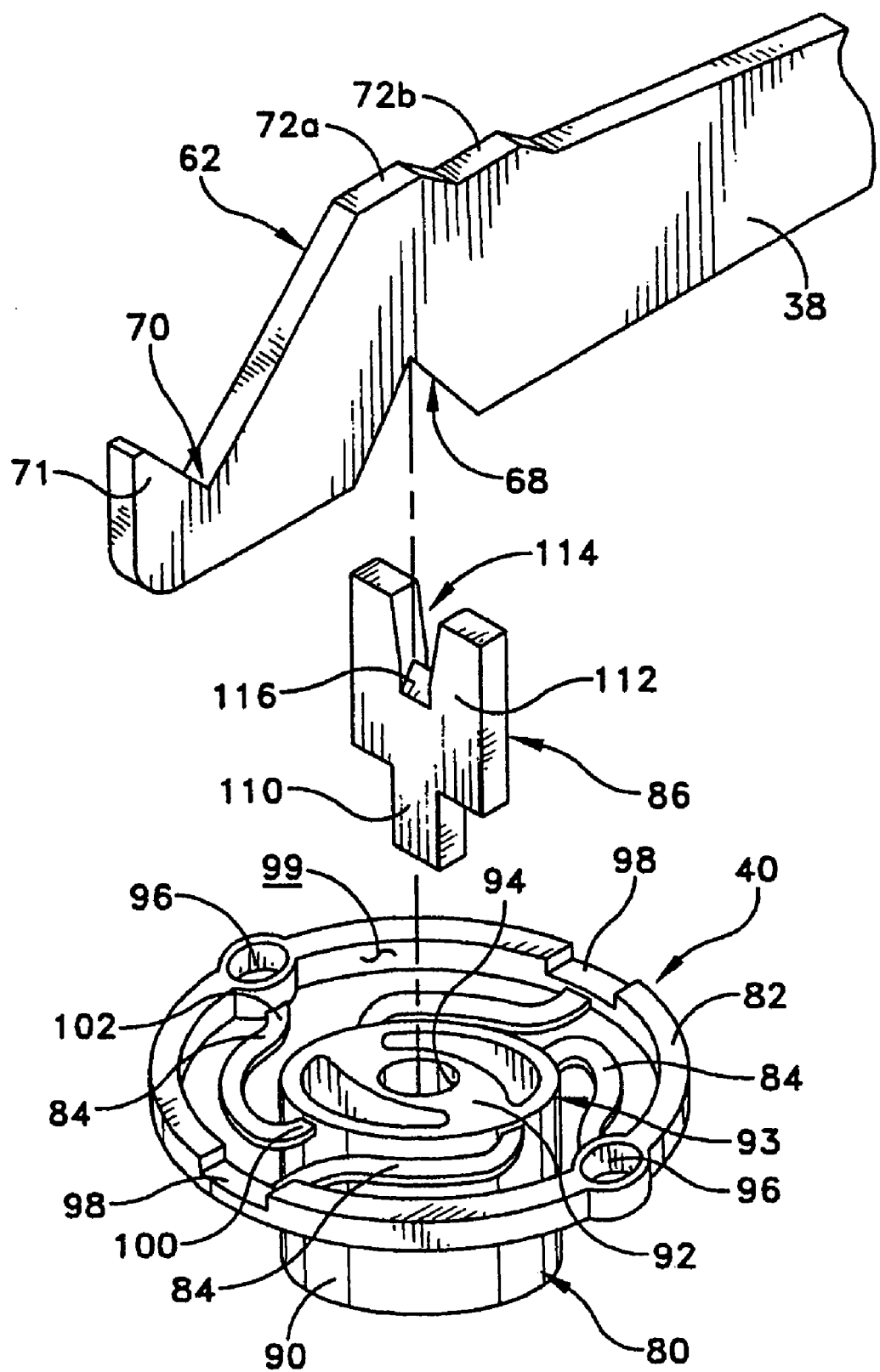
FIG. 5 is a partially broken away, exploded perspective view of a foot assembly and secondary beam formed in accordance with the present invention.
Figure 6:
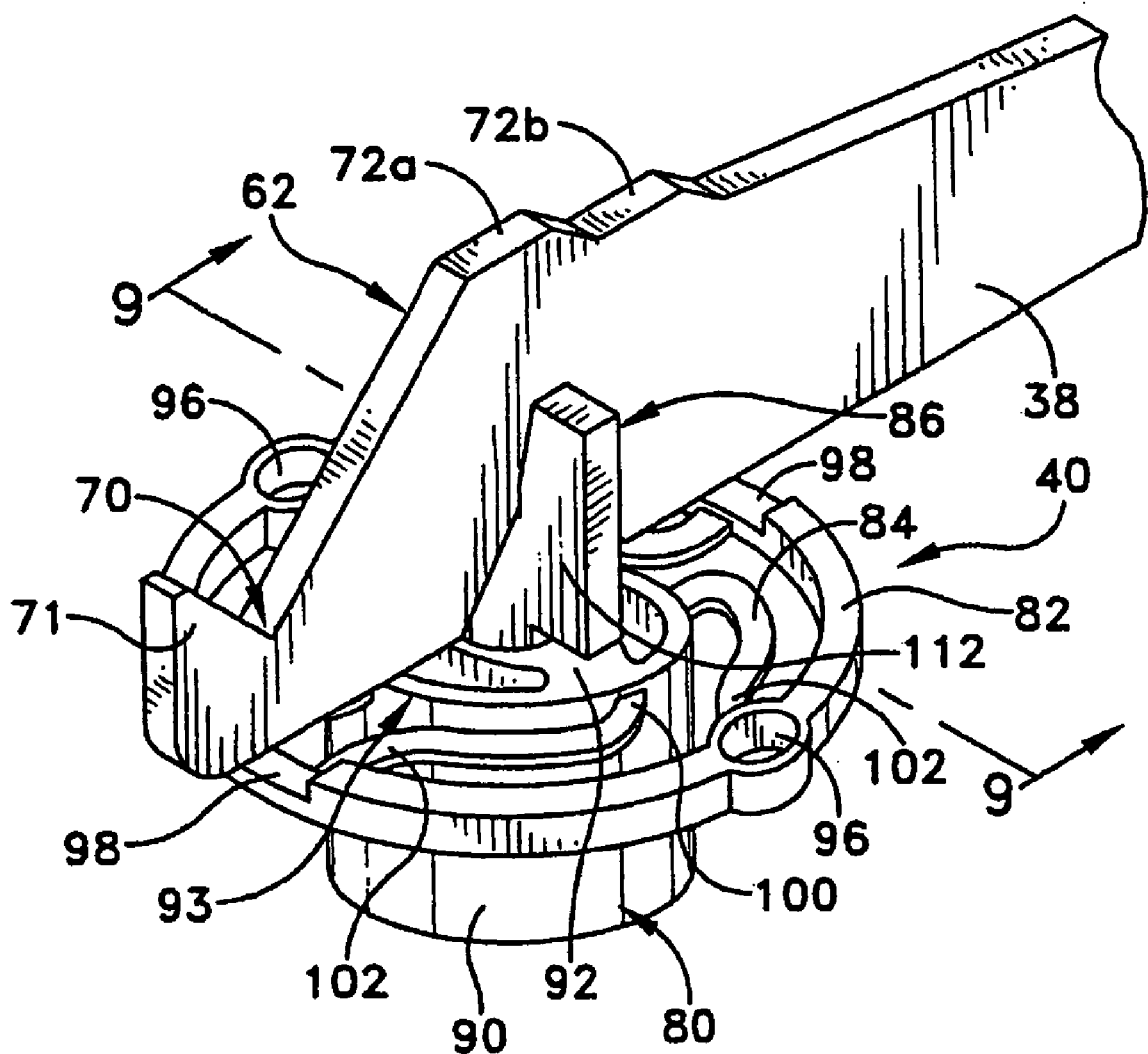
FIG. 6 is a partially broken away, perspective view of the foot assembly shown in FIG. 5, assembled in accordance with the present invention.

Secondary beams 38 are also formed from a substantially flat strip of metal having a length that is larger than its width, and a width that is larger than its thickness, e.g. a thin, elongate plate. Each secondary beam 38 includes a foot engagement end 62 and a coupling end 64. Secondary beams 38 are generally shorter than primary beams 36, and are arranged within channels 29 of central surface 25 such that coupling ends 64 are located within coupling hole 57 of an adjacent primary beam 36. Each foot engagement end 62 includes a substantially "V" shaped pier-notch notch 68, a substantially "V" shaped tray-notch 70, a cam lock 71 and a pair of platform support pads 72a,72b (FIGS. 5 and 6). Pier-notch 68 and tray-notch 70 open onto different edges of foot engagement end 62. Each coupling end 64 is sized and shaped to be received within coupling hole 57 of an adjacent primary beam 36. A biasing spring 77 is positioned on central surface 25 directly below each secondary beam 38 so as to bias each coupling end 64 against a portion of the interior surface of primary beam 36 that defines coupling hole 57. In this arrangement, foot engagement ends 62 are positioned in spaced apart relation to one another, and each overtop of a respective aperture 27.

Referring to FIGS. 3–9, each foot assembly 40 includes a base 80, an annular clamp-ring 82, a plurality of resilient beams 84, and a pier 86. More particularly, base 80, annular clamp-ring 82, and beams 84 are preferably formed as an integral unit (e.g., by injection molding) from one of the well known polymer materials that are suitable for use in structures requiring mechanical strength and integrity, e.g., poly-halo-olefins, polyamides, polyolefins, polystyrenes, polyvinyls, polyacrylates, polymethacrylates, polyesters, polydienes, polyoxides, polyamides and polysulfides and their blends, copolymers and substituted derivatives thereof.

Figure 7:
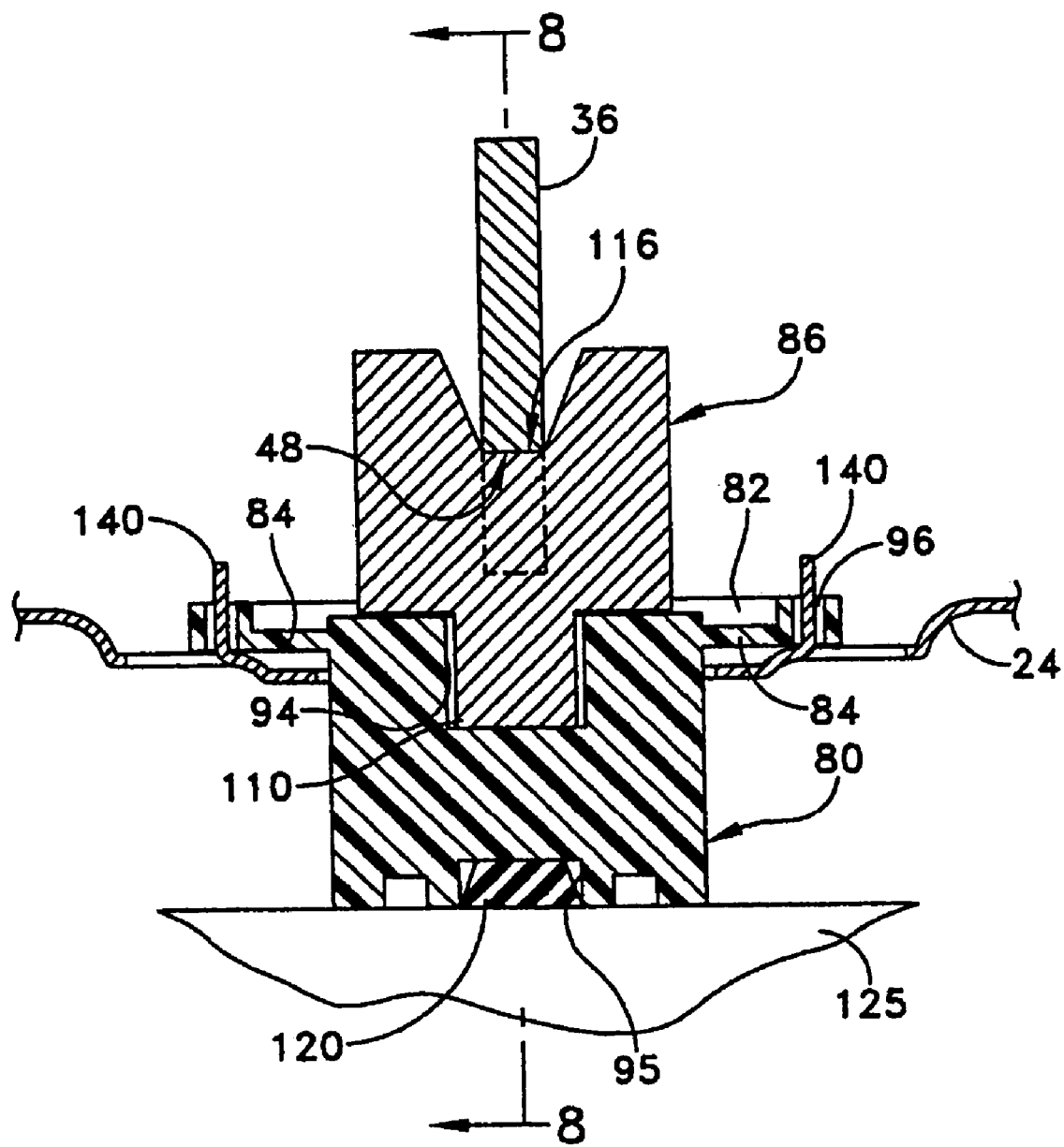
FIG. 7 is a cross-sectional view of the assembled foot assembly shown in FIG. 4, as taken along the lines 7—7 in FIG. 4.

Base 80 often comprises a cylinder defined by a cylindrical wall 90 having a partial top wall 92 and central blind openings 94,95 (FIGS. 3 and 7). Annular clamp-ring 82 is arranged in coaxial spaced relation to a top portion 93 of cylindrical wall 90, and includes at least two through-holes 96 and at least two recesses 98 that are arranged in circumferentially spaced relation to one another, e.g., at 90.degree. intervals around the circumference of the annular ring.

Plurality of resilient beams 84 are arranged in circumferentially spaced relation to one another, e.g., at 90.degree. intervals around the circumference of annular clamp-ring 82. Each beam 84 has a first end 100 that is fixedly clamped (e.g., integrally molded, or the like) to top portion 93 of cylindrical wall 90 and a second end 102 that is fixedly clamped to an inner surface 99 of annular clamp-ring 82. In this way, each beam 84 projects radially outwardly or away from top portion 93.

Advantageously, each second end 102 is fixedly clamped at a location on inner surface 99 of annular clamp-ring 82 that is circumferentially spaced away from the location on top portion 93 of cylindrical wall 90 at which first end 100 is fixedly clamped to top portion 93 of base 80. The locations on annular clamp-ring 82 at which each second end 102 is fixedly clamped to inner surface 99 correspond to either one of through-holes 96 or one of recesses 98. In order to facilitate this arrangement, resilient beams 84 often have a compound curve contour, i.e., having curved sections defined by separate and spaced apart centers, e.g., as in the letter "S" or the mathematical symbol for an integral sign ".intg.". Of course, while a beam 84 having a compound curve contour is preferable, other shapes and profiles of beam are possible for use with the present invention. In any case, it is the combination of the resilient spring properties of beams 84 and the transversely off-set positioning of their fixed first and second ends that provides for a high degree of compensation when unwanted rotational moments and twisting torques are applied to foot assemblies 40.

Figure 8:
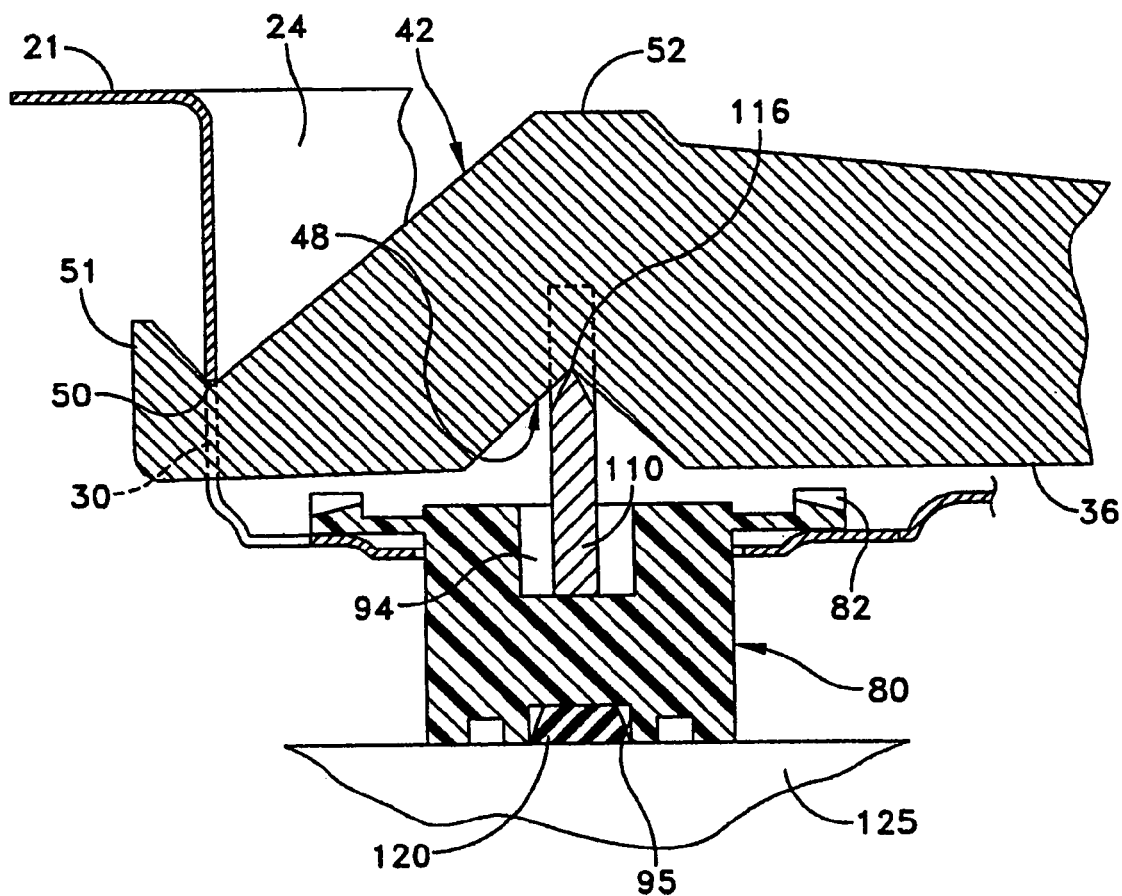
FIG. 8 is a cross-sectional view of the foot assembly shown in FIGS. 4 and 7, as taken along the lines 8—8 in FIG. 7.
Figure 9:
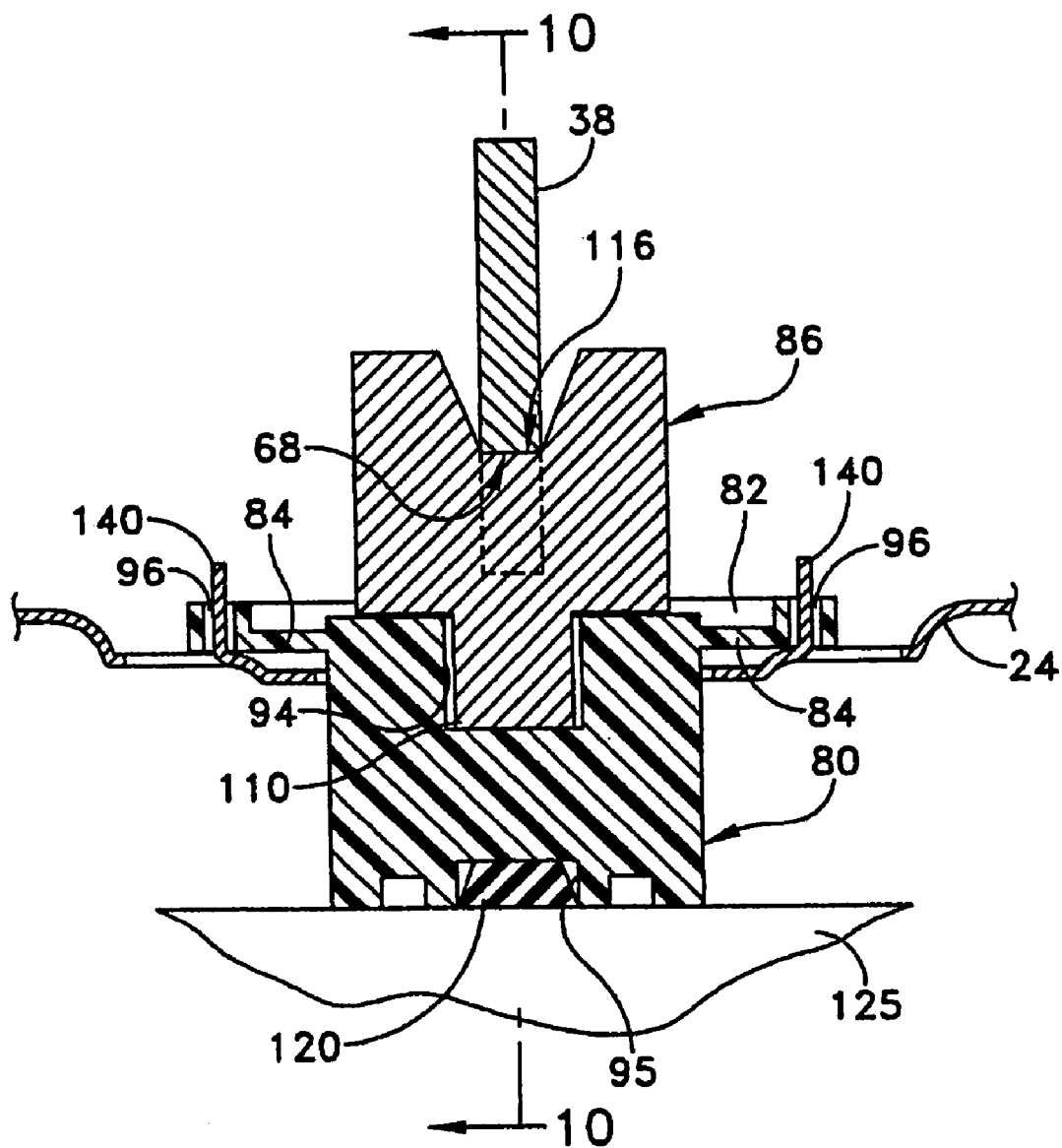
FIG. 9 is a cross-sectional view of the assembled foot assembly shown in FIG. 6, as taken along the lines 9—9 in FIG. 6.
Figure 10:
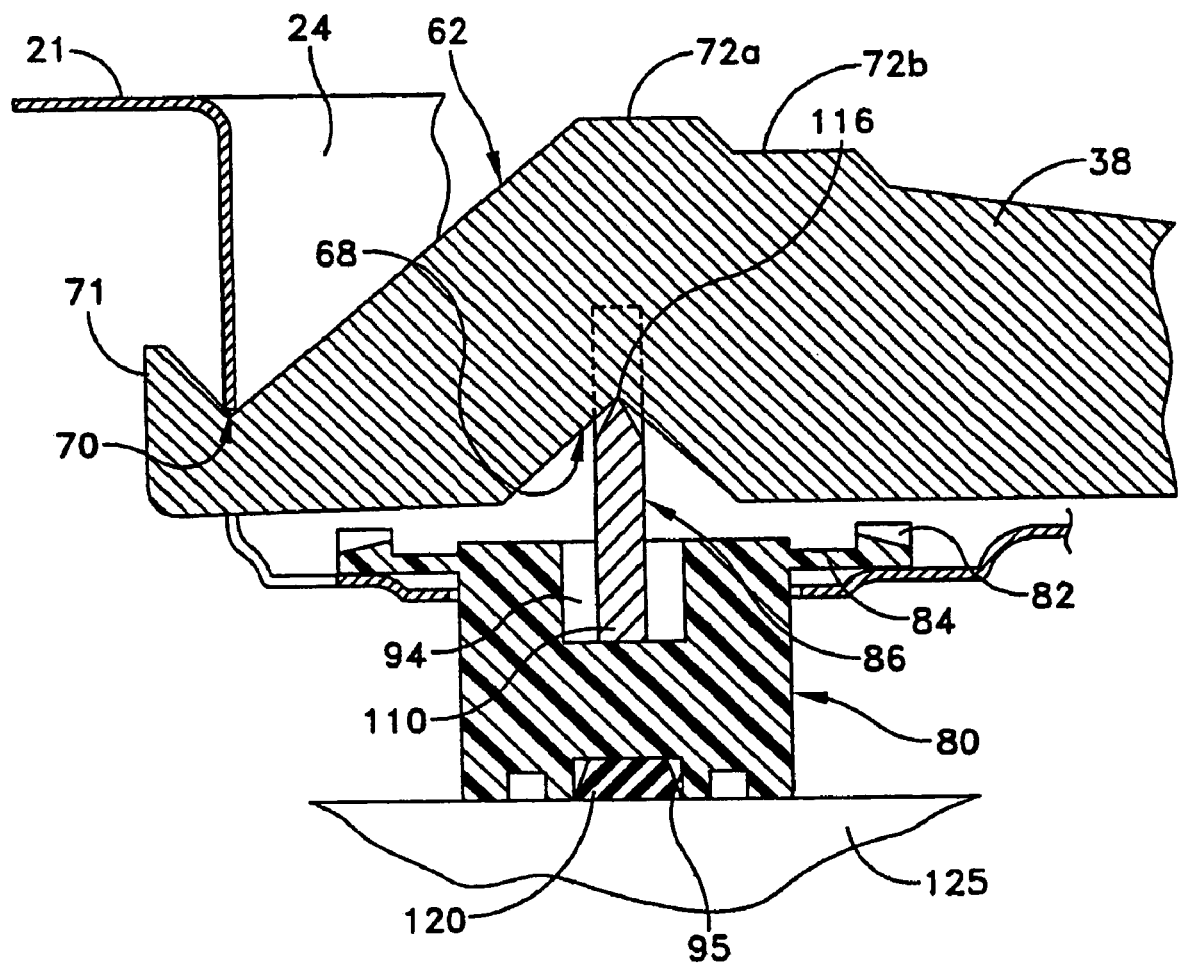
FIG. 10 is a cross-sectional view of the foot assembly shown in FIGS. 6 and 9, as taken along the lines 10—10 in FIG. 9.

Referring again to FIGS. 3–6, pier 86 is preferably formed from a metal, and includes a leg 110 that projects downwardly from a plate 112. A central slot 114 is defined in plate 112, with knife-edge support 116 formed in plate 112 at the bottom of slot 114. A pad 120 is often positioned within blind opening 95 of base 80 in coaxially aligned relation to leg 110 so as to provide for a non-slip engagement with a support surface 125 (FIGS. 6–8).

Referring once again to FIG. 2, weight determination assembly 18 and display 20 are of the type often used in the weighing scale arts. For example, the load cell having a bossed sensor plate taught in U.S. Pat. No. 6,417,466, hereby incorporated herein by reference, provides a weight determination assembly 18 that is adequate for use with the present invention. Briefly, such a weight determination assembly includes a sensor plate for use in a load cell comprising a planar first surface, a planar second surface opposite the first surface which includes a depression formed therein defining a flexure area. A load cavity is formed in the second surface having a conical receptacle end for receiving a strut. Sensors 126 are disposed over the flexure area for generating a signal in response to a load applied to the loading cavity, via interaction with sensor engagement ends 44 of primary beams 36. The signal is communicated to display 20 via conductors 127. In this way, the strut has a first conical projection end coupled to the conical receptacle end of the loading cavity and a second end coupled to a foot member such that the strut mechanically floats therebetween for providing the applied load at a substantially central position at the load cavity. Weight determination assembly 18 may be mounted on a channel support 128 forming part of mounting tray 14. Display 20 may comprise a known mechanical, electromechanical or electronic numerical display panel of the types that are well known in the art for presenting analog or digital numerical data, e.g., a rotary dial, LED, or LCD panels or the like.

Scale 10 is assembled and functions in the following manner. Each foot assembly 40 is first positioned for placement within mounting tray 14 such that base 80 is arranged in confronting coaxially relation with an aperture 27. Once in this position, base 80 is moved toward and into aperture 27 until annular clamp-ring 82 engages the portion of central surface 25 that defines the perimeter of aperture 27. As this occurs, mounting studs 140 slip into each of through-holes 96. Mounting studs 140 are then bent over thereby clamping annular clamp-ring 82 securely to mounting tray 14. As a result of this construction, recesses 98 are arranged in parallel aligned relation to slot 30. Once in this position, a pier 86 may be positioned within each foot assembly 40 by positioning leg 110 in confronting coaxial relation with central blind opening 94. Pier 86 is then moved toward base 80 until leg 110 engages the bottom of central blind opening 94. In this position, slot 114 is arranged in parallel aligned relation with slot 30 in wall 24 and recesses 98 in annular clamp-ring 82.

Force transfer assembly 16 is assembled to foot assemblies 40 and mounting tray 14 by first inserting each coupling end 64 of each secondary beam 38 into it's corresponding coupling hole 57 of a primary beam 36. Once in this position, the combined primary and secondary beams are arranged in spaced confronting relation to channels 29 such that foot engagement ends 42 and 62 are positioned in confronting relation to piers 86 of foot assemblies 40 (FIGS. 3 and 5). Once in this position, primary and secondary beams 36,38 are moved toward foot assemblies 40 such that pier-notches 48,68 enter slots 114 of piers 86, while at the same time, cam locks 51,71 enter slots 30 in wall 24 of mounting tray 14. When pier-notches 48,68 fully engage knife-edge 116 of piers 86, tray-notches 50,70 are seated against the edge of wall 24 that defines the terminal edge of each slot 30.

As a result of this construction, mounting tray 14 is isolated from support surface 125 via foot assemblies 40 and foot engagement ends 42,62. In other words, mounting tray 14 is supported by the engagement of tray-notches 50,70 with the edge of wall 24 that defines the terminal edge of each slot 30. Primary beams 36 and secondary beams 38 are in turn supported upon each knife-edge 116 located within pier-notches 86. Thus, mounting tray 14 is isolated from support surface 125, i.e., it does not directly contact support surface 125. In this way, forces applied to weighing scale 10 by the placement of a load on platform 12 are transferred to force transfer assembly 16, via foot assemblies 40, without direction interaction between the underside of mounting tray 14 and support surface 125.

Referring once again to FIG. 2, when foot engagement ends 42,62 are fully assembled to foot assemblies 40, sensor engagement ends 44 of primary bending beams 36 are disposed in operative engagement with the deflector area of the sensor plate within weight determination assembly 18.

With all of the foregoing components in place, platform 12 may be secured to mounting tray 14 such that a portion of the underside of platform 12 engages each of platform support pads 52 and 72a or 72b.

Figure 11:
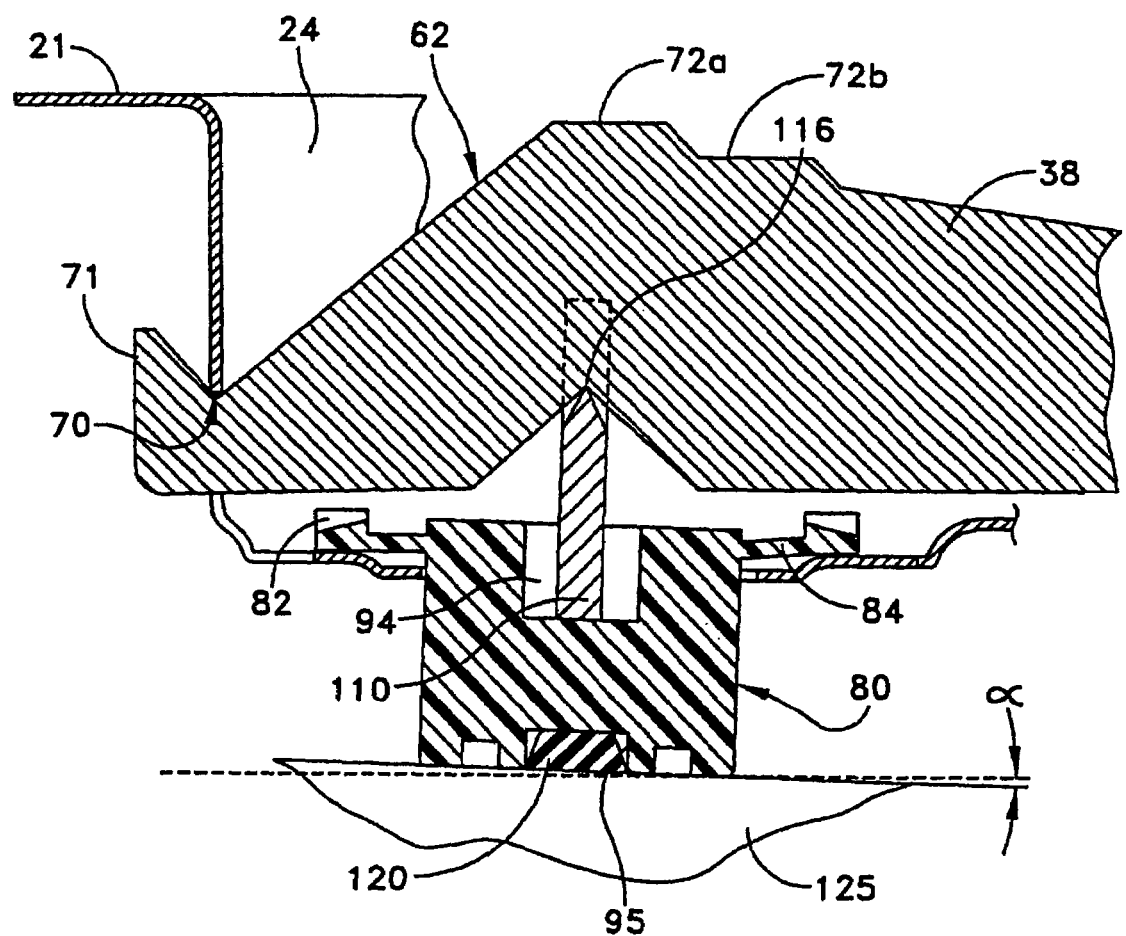
FIG. 11 is a cross-sectional view similar to that shown in FIG. 10, but illustrating the affect of an uneven support surface on the foot assembly of the present invention.

In operation, when a load is placed on plastic sheet 23 of platform 12, the force is transferred to force transfer assembly 16, via all four of support pads 52,72, to weight determination assembly 18. Referring to FIG. 11, if support surface 125 is canted at some angle .alpha., resilient beams 84 twist and/or bend so as to take up and compensate for the resultant unwanted rotational moments or twisting torques being applied to primary beam 36 or secondary beam 38. In this way, knife edge support 116 is maintained in aligned contact with it's respective pier-notches 48,68 so as to prevent changes in the load induced deformation of primary beams 36 and secondary beams 38. In this way, the load induced deformation of primary beams 36 and secondary beams 38 is solely a function of the changes in the weight of the load applied to platform 12. In other words, foot assemblies 40 in combination with primary beams 36 and secondary beams 38 couple the load to the beams without significant affect from rotational moments or twisting torques that are applied to foot assemblies.

It is to be understood that the present invention is by no means limited only to the particular constructions herein disclosed and shown in the drawings, but also comprises any modifications or equivalents within the scope of the claims.

What is claimed is:

1. A weighing scale comprising: a platform operatively coupled to a plurality of foot assemblies, each foot assembly comprising: a base having a bottom surface for contacting a portion of a floor; and a plurality of deformable compensation beams coupled to said base and projecting outward from a portion of the base; a plurality of force transfer beams arranged to operatively interconnect to said plurality of foot assemblies; a mounting portion coupled to a bottom surface of said platform and associated with each of said plurality of foot assemblies; wherein in response to a force applied to a top surface of said platform, said force is translated to said mounting portion engaging said bottom surface without said platform contacting said force transfer beams, to cause a downward force to be applied to said foot assemblies, and wherein said deformable beams tend to locate said applied force at a central position where said foot assemblies engage said force transfer beams.

2. The weighing scale according to claim 1 wherein said mounting portion comprises a mounting tray having a plurality of apertures for receiving said foot assemblies.

3. The weighing scale according to claim 2 wherein said mounting tray includes a raised perimeter portion which engages said bottom surface of said platform.

4. The weighing scale according to claim 2 wherein said mounting tray includes a plurality of slots for receiving corresponding ends of said force transfer beams.

5. The weighing scale according to claim 1 wherein said deformable beams comprises a compound curve contour.

6. The weighing scale according to claim 1 wherein said base includes at least one blind opening sized to receive a portion of a pier associated with said force transfer beams.

* * * * *